United States Patent
Okano

(10) Patent No.: US 7,271,828 B2
(45) Date of Patent: Sep. 18, 2007

(54) DISPLAY SCREEN BURN-IN PREVENTION DEVICE AND BURN-IN PREVENTION METHOD

(75) Inventor: Akihiro Okano, Fukuroi (JP)

(73) Assignee: Pioneer Corporation, Tokyo (JP)

( * ) Notice: Subject to any disclaimer, the term of this patent is extended or adjusted under 35 U.S.C. 154(b) by 38 days.

(21) Appl. No.: 10/816,855

(22) Filed: Apr. 5, 2004

(65) Prior Publication Data

US 2004/0196373 A1    Oct. 7, 2004

(30) Foreign Application Priority Data

Apr. 7, 2003    (JP) ............................. 2003-102596

(51) Int. Cl.
  *H04N 3/20*    (2006.01)
  *G09G 5/00*    (2006.01)
(52) U.S. Cl. ...................................... 348/173; 345/617
(58) Field of Classification Search ............. 315/169.3, 315/380; 715/867; 345/617, 618; 348/173
  See application file for complete search history.

(56) References Cited

U.S. PATENT DOCUMENTS 4,722,005 A * 1/1988 Ledenbach ............ 348/173
6,313,878 B1 * 11/2001 Jankowiak ............ 348/377
6,369,851 B1 * 4/2002 Marflak et al. ........... 348/173
2001/0035874 A1 * 11/2001 Hamilton et al. .......... 345/682
2002/0191846 A1 * 12/2002 Crinon et al. ............. 382/173
2004/0114040 A1 * 6/2004 Bellwood et al. ......... 348/173
2004/0165064 A1 * 8/2004 Weitbruch et al. ........ 348/173

FOREIGN PATENT DOCUMENTS

JP    8-248935    9/1996

* cited by examiner

*Primary Examiner*—Kee M. Tung
*Assistant Examiner*—Aaron M. Richer
(74) *Attorney, Agent, or Firm*—McGinn IP Law Group, PLLC

(57) ABSTRACT

A burn-in prevention image signal is generated by subjecting an input image signal to blurring and then to contrast inversion to invert the contrast of the signal luminance level. The burn-in prevention image signal is used when the input image is a still image that does not change for a predetermined period.

20 Claims, 5 Drawing Sheets

FIG. 3A ORIGINAL IMAGE
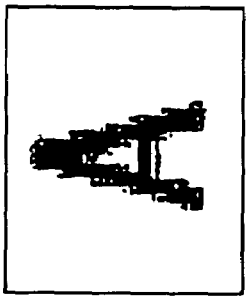
FIG. 3B IMAGE BASED ON QUANTIZED PIXEL DATA QD
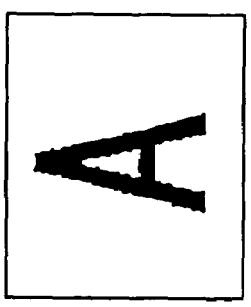
FIG. 3C IMAGE BASED ON BURN-IN PREVENTION PIXEL DATA FD

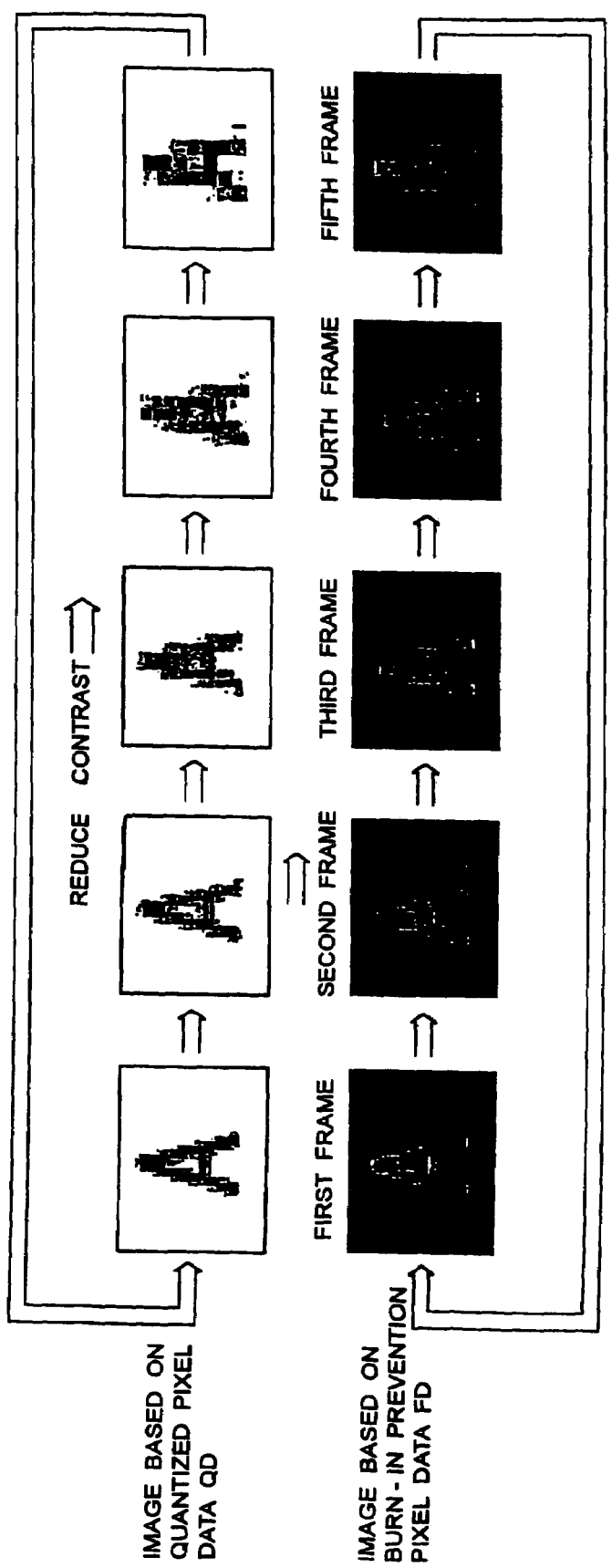

DISPLAY SCREEN BURN-IN PREVENTION DEVICE AND BURN-IN PREVENTION METHOD

BACKGROUND OF THE INVENTION

1. Field of the Invention

The present invention relates to a device for preventing burn-in of a display screen of an image display device, and to a burn-in prevention method.

2. Description of the Related Art

When a display device, such as a cathode ray tube or plasma display panel, displays images by utilizing the luminous phenomenon that accompanies the excitation of phosphor, and continuously displays a still image for a long period, so-called 'burn-in' results when the phosphor deteriorates. One way of preventing the burn-in of the screen is displaying an image by inverting the contrast of the luminance represented by an image signal, as disclosed in Japanese Patent Kokai (Laid Open Publication) No. H8-248935.

However, as the phosphor ages, it becomes difficult to prevent the burn-in by simply displaying an image with the inversion of the luminance contrast.

SUMMARY OF THE INVENTION

One object of the present invention is to provide a device that can prevent burn-in of a display screen effectively.

Another object of the present invention is to provide a method that can prevent burn-in of a display screen effectively.

According to one aspect of the present invention, there is provided a novel device that prevents burn-in of a display screen of an image display device. The display screen burn-in prevention device includes a blurring circuit for subjecting an input image signal to blurring. The display screen burn-in prevention device also includes a contrast inversion circuit for generating a burn-in prevention image signal by subjecting the input image signal that has undergone blurring, to processing of inversion of the contrast of the luminance level. The blurring circuit may be a quantizer or a mosaicking circuit.

According to another aspect of the present invention, there is provided a novel display screen burn-in prevention method that prevents burn-in of the display screen of an image display device. The display screen burn-in prevention method includes subjecting an input image signal to blurring (blurring step). The method also includes generating a burn-in prevention image signal by subjecting the input image signal that has undergone blurring, to processing of inversion of the contrast of the luminance level (contrast inversion step).

According to still another aspect of the present invention, there is provided a display apparatus including a display device having a display screen, a contour modification circuit for blurring an input image to obtain a blurred image when the input image is a still image, a contrast inversion circuit for inverting contrast of a luminance level of the blurred image to obtain a contrast inverted image, and a driver for displaying the contrast inverted image on the display screen when the input image is a still image. The contour modification circuit may be a quantizer or a mosaic circuit. The display apparatus may further include a controller for shifting, with an elapse of time, a display position of the burn-in prevention image on the display screen.

Other objects, aspects and advantages of the present invention will become apparent to those skilled in the art to which the present invention pertains from the following detailed description and the appended claims when read and understood in conjunction with the accompanying drawings.

BRIEF DESCRIPTION OF THE DRAWINGS

FIG. 3A shows an input image signal (original image) that renders a character A whose background is white and text color is black;

FIG. 3B shows an image based on quantized pixel data derived from the original image of FIG. 3A;

FIG. 3C shows an image based on burn-in prevention pixel data derived from the image of FIG. 3B;

FIG. 4 shows five images based on quantized pixel data and corresponding five images based on burn-in prevention pixel data when the quantization level is changed for each frame.

DETAILED DESCRIPTION OF THE INVENTION

Embodiments of the present invention will be described in detail hereinbelow with reference to the drawings.

Figure 1:
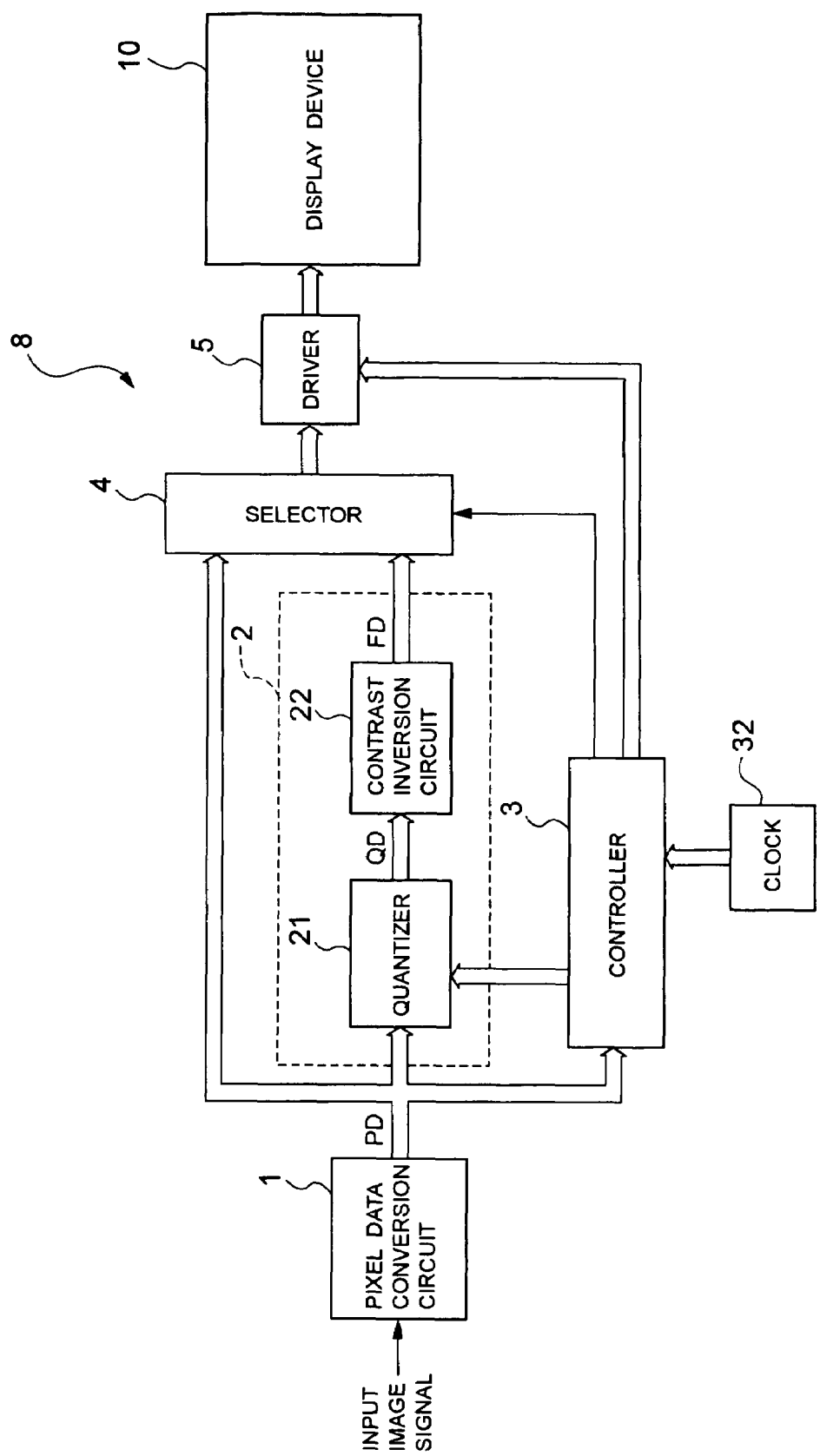
FIG. 1 shows a block diagram of an image display apparatus having a burn-in prevention device according to one embodiment of the present invention.

Referring to FIG. 1, a schematic cofiguration of an image display apparatus 8 equipped with a burn-in prevention device according to one embodiment of the present invention is shown.

Figure 2:
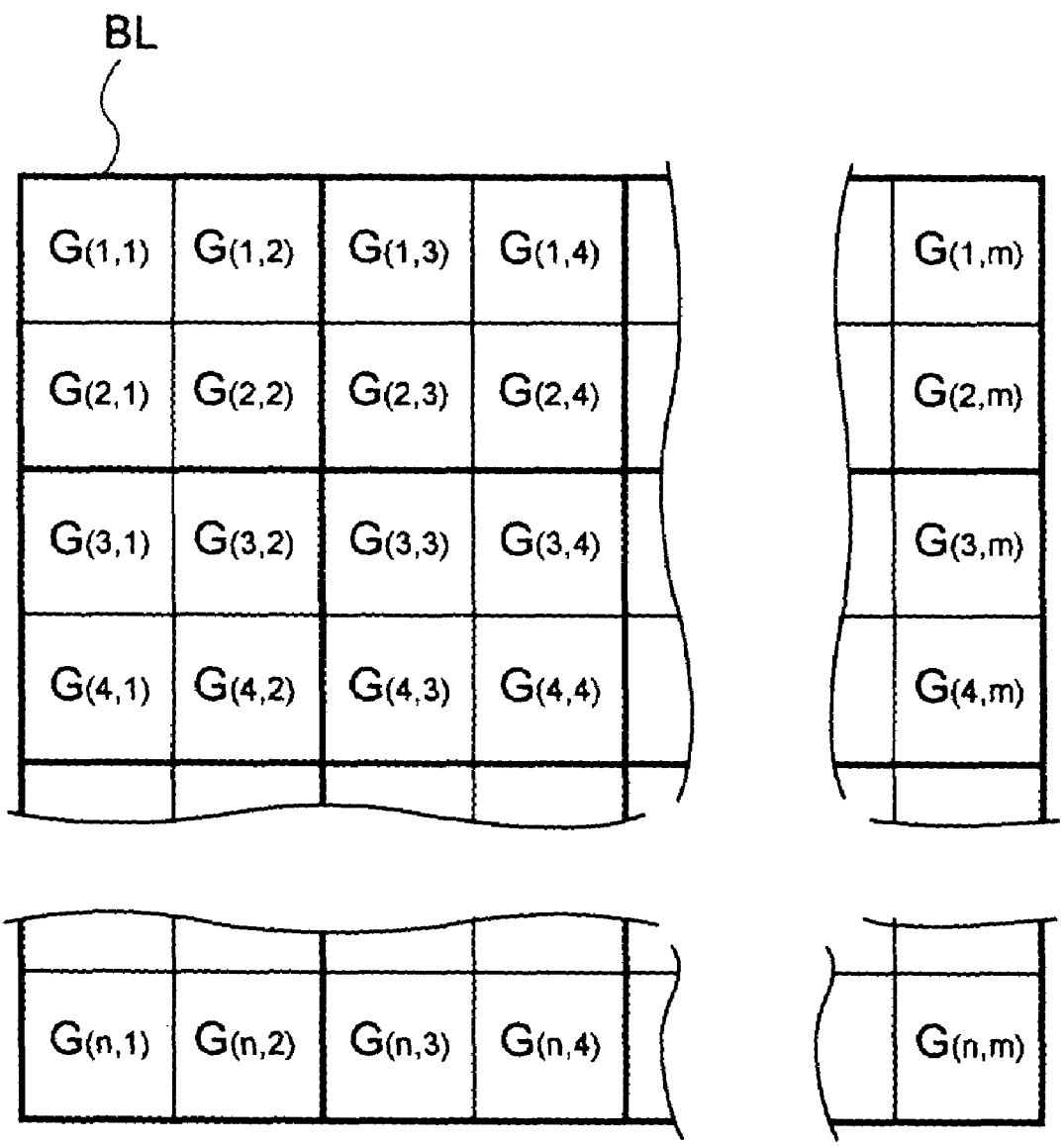
FIG. 2 shows an example of the arrangement of pixels on a screen of a display device shown in FIG. 1 and pixel blocks that serve as base units for quantization.

In FIG. 1, a display unit 10 of the image display apparatus 8 includes a CRT (Cathode Ray Tube), or a plasma display panel, or the like. Pixels $G_{(1,1)}$ to $G_{(n,m)}$ like those shown in FIG. 2 are arranged in a single screen (n rows×m columns) of the display unit 10. Each of the pixels $G_{(1,1)}$ to $G_{(n,m)}$ is actually a combination of three pixels (namely, a red pixel $G_R$, which exhibits red light emission, a green pixel $G_G$, which exhibits green light emission, and a blue pixel $G_B$, which exhibits blue light emission).

A pixel data conversion circuit 1 converts an input image signal into pixel data $PD_{(1,1)}$ to $PD_{(n,m)}$ which correspond with the pixels $G_{(1,1)}$ to $G_{(n,m)}$ of the display unit 10, and supplies these pixel data PD to a burn-in prevention circuit 2 and control circuit 3. Each pixel data $PD_{(i,j)}$ is 8-bit data, for example, which indicates the luminance levels for the red pixel $G_R$, the green pixel $G_G$, and the blue pixel $G_B$. For example, the pixel data $PD_{(1,1)}$, which corresponds with the pixel $G_{(1,1)}$ at the first row and first column of the screen, expresses, by way of 8 bits, the luminance level of the red pixel $G_{R(1,1)}$, the luminance level of the green pixel $G_{G(1,1)}$, and the luminance level of the blue pixel $G_{B(1,1)}$. A clock circuit 32 times the current time, and supplies time data representing the current time to the control circuit 3.

The control circuit 3 determines, based on this time data, whether or not an image based on the input pixel data PD is the same over a predetermined first period T1. The control circuit 3 determines that this image is a still image when the image is the same over the first period T1, whereas the control circuit 3 determines that the image is a non-still image (or moving image) when the image is not the same in the first period T1. The control circuit 3 supplies a selection signal for selecting the burn-in prevention pixel data FD (described later) to the selector 4 when the image is determined to be a still image. When, on the other hand, the image is determined as being a moving image, the control circuit 3 supplies another selection signal for selecting the input pixel data PD to the selector 4. After the control circuit 3 has determined that the image based on the input pixel data PD is a still image over the period T1, the control circuit 3 keeps monitoring the image based on the input pixel data PD over a second predetermined period T2. If the image is a still image even after the second period T2, the control circuit 3 controls a driver 5 to raise the luminance level of the whole screen by a predetermined level. The control circuit 3 also supplies a quantization level setting signal (described subsequently) for designating the basic unit of the quantization to the burn-in prevention circuit 2.

The burn-in prevention circuit 2 applies a burn-in prevention process to the pixel data PD and supplies the resulting data (i.e., burn-in prevention pixel data) FD to the selector 4.

The selector 4 selects the burn-in prevention pixel data FD or the input pixel data PD in accordance with the selection signal supplied by the control circuit 3 and supplies the selected data to the driver 5. The driver 5 generates a drive signal for displaying an image that corresponds with the pixel data supplied by the selector 4, and then supplies the drive signal to the display device 10. The display device 10 displays the image in accordance with the drive signal supplied by the driver 5.

The detailed operation of the burn-in prevention circuit 2 will be described below.

The burn-in prevention circuit 2 includes a quantizer 21 and contrast inversion circuit 22 as shown in FIG. 1, for example.

The quantizer 21 first divides the pixels G in the screen of the display device 10 into a plurality of blocks BL. Each pixel block BL consists of a certain number of pixels G (N rows ×M columns). In the example shown in FIG. 2, each pixel block BL consists of four pixels G (2 rows×2 columns), as enclosed by the bold line squares. The quantizer 21 calculates an average value of the four pixel data PD of the four pixels G in each pixel block BL. The size of the pixel block (i.e., N and M) is determined in accordance with the quantization level-setting signal supplied by the control circuit 3. When the quantizer 21 receives the quantization level-setting signal which indicates that N is two and M is two, the quantizer 21 calculates the average value of the four pixel data PD for each of the red, green, and blue.

The quantizer 21 supplies these average values to the contrast inversion circuit 22 as quantized pixel data QD of the pixel block concerned. For example, using the equation below, the quantizer 21 seeks, for the first pixel block BL, the average value of the pixel data $PD_{(1,1)}$, $PD_{(1,2)}$, $PD_{(2,1)}$, and $PD_{(2,2)}$ of the pixels $G_{(1,1)}$, $G_{(1,2)}$, $G_{(2,1)}$, and $G_{(2,2)}$, and renders the average value the quantized pixel data $QD_{(1,1)}$, $QD_{(1,2)}$, $QD_{(2,1)}$, and $QD_{(2,2)}$ of the pixels $G_{(1,1)}$, $G_{(1,2)}$, $G_{(2,1)}$, and $G_{(2,2)}$.

$$QD_{(1,1)} = QD_{(1,2)} = QD_{(2,1)} = QD_{(2,2)} = [PD_{(1,1)} + PD_{(1,2)} + PD_{(2,1)} + PD_{(2,2)}]/4$$

Accordingly, the red luminance levels indicated by the quantized pixel data $QD_{(1,1)}$, $QD_{(1,2)}$, $QD_{(2,1)}$, and $QD_{(2,2)}$ are equal to each other. Likewise, the green luminance levels indicated by the quantized pixel data $QD_{(1,1)}$, $QD_{(1,2)}$, $QD_{(2,1)}$, and $QD_{(2,2)}$ are equal to each other, and the blue luminance levels indicated by the quantized pixel data $QD_{(1,1)}$, $QD_{(1,2)}$, $QD_{(2,1)}$, and $QD_{(2,2)}$ are equal to each other.

At this point, if the modified image represented by the quantized pixel data QD is compared with the original image represented by the input pixel data PD, the outline or contour of the displayed object in the modified image is blurred, that is, in a 'faded' state.

The contrast inversion circuit 22 inverts the contrast of the luminance level indicated by the quantized pixel data QD by inverting the logic level of each bit of the quantized pixel data QD, so as to obtain the burn-in prevention pixel data FD. The contrast inversion circuit 22 then supplies the burn-in prevention pixel data FD to the selector 4.

FIG. 3A shows an original image that represents a character 'A' whose background is white and text color is black. FIG. 3B shows an image based on quantized pixel data QD derived from the original image. FIG. 3C shows an image based on burn-in prevention pixel data FD derived from the image of FIG. 3B. When the image display apparatus 8 is supplied with a still image signal, the display device 10 of the image display apparatus 8 shows an image based on the burn-in prevention pixel data FD as shown in FIG. 3C. As depicted in FIG. 3B, in the image based on the quantized pixel data QD, the outline of the character 'A' is blurred in comparison with the original image 'A' of FIG. 3A based on the input pixel data PD. The contrast of the luminance level of the image of FIG. 3B is then inverted to obtain the image of FIG. 3C. Accordingly, the image display based on the burn-in prevention pixel data FD does not readily cause the burn-in in comparison with a conventional display method in which only contrast inversion is performed without implementing the above-mentioned quantization.

The quantization may be carried out by gradually changing the quantization level for each one frame's worth of input pixel data PD. For example, the control circuit 3 supplies a quantization level setting signal for implementing quantization for each "2 row×2 column" pixel block to the quantizer 21 for the first frame. In the second frame, the control circuit 3 supplies a quantization level setting signal for implementing quantization for each "3 row×3 column" pixel block to the quantizer 21. In the third frame, the control circuit 3 supplies a quantization level setting signal for implementing quantization for each "4 row×4 column" pixel block to the quantizer 21. In the fourth frame, the control circuit 3 supplies a quantization level setting signal for implementing quantization for each "5 row×5 column" pixel block to the quantizer 21. In the fifth frame, the control circuit 3 supplies a quantization level setting signal for implementing quantization for each "6 row×6 column" pixel block to the quantizer 21. The control circuit 3 then repeats these gradually-changing quantization operations for the subsequent each five frames.

As a result, the quantization level of the quantizer 21 gradually changes with the frames. As shown in FIG. 4, the outline of the display object 'A' in the image based on the quantized pixel data QD gradually becomes blurred from the first frame to the fifth frame. Although the more blurred the outline of the display object becomes, the harder it is for burn-in to occur, the display object then becomes more difficult to see to the same degree. In this embodiment, as shown in FIG. 4, after reaching its most blurred state, the outline of the display object returns to a comparatively clear state so that the user is able to identify the display object 'A'.

Therefore, because of the control operation as described above, burn-in of the display device 10 can be effectively prevented without hindering identification (recognition) of the display object by the user.

The above described quantization and contrast inversion may be performed in combination with display position variation in which the position of the display object in the screen is varied with an elapse of time.

Figure 5:
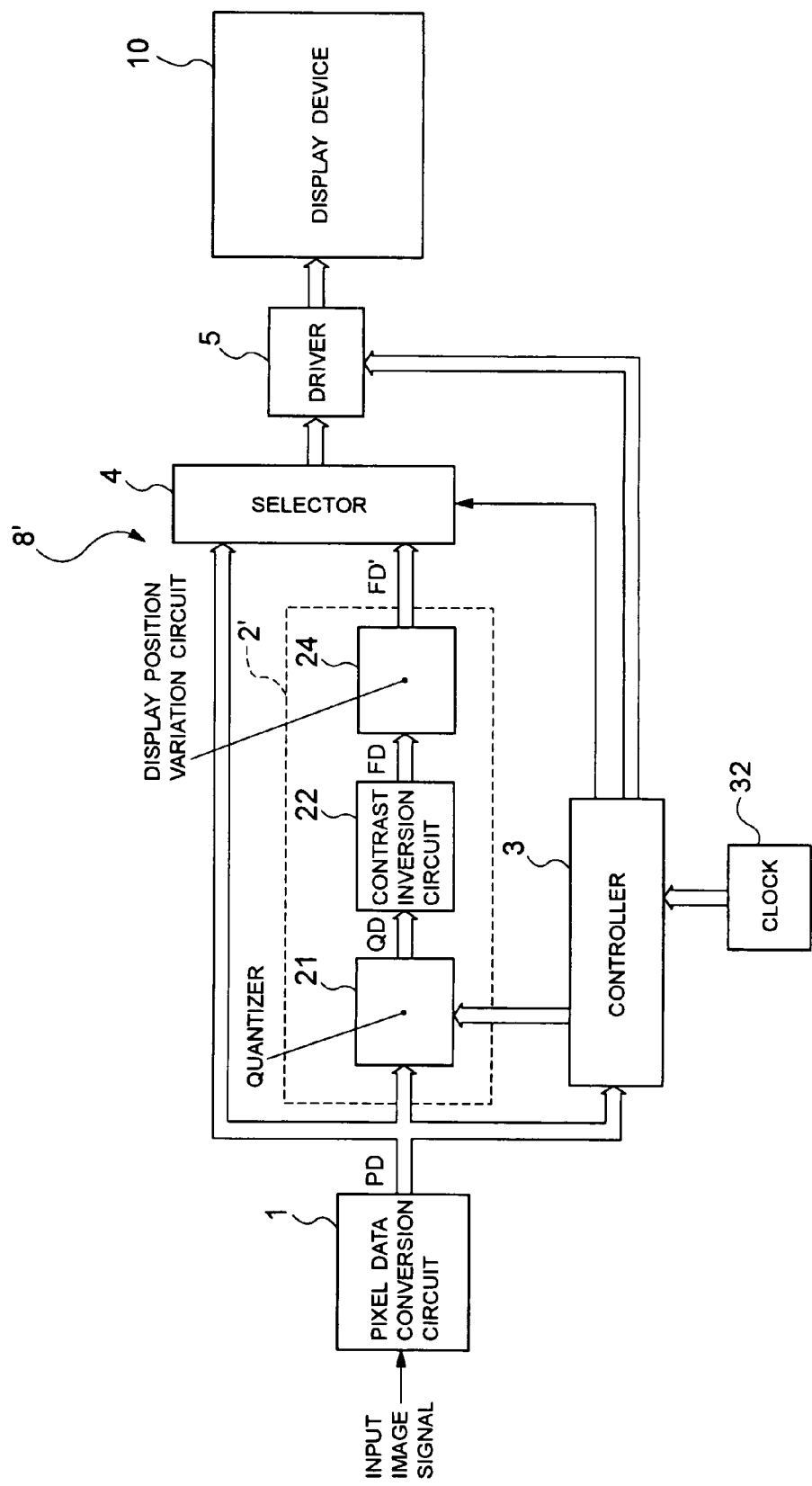
FIG. 5 shows a block diagram of an image display apparatus having a modified burn-in prevention device according to another embodiment of the present invention.

FIG. 5 shows another image display apparatus 8' that is conceived in view of this point.

The image display apparatus 8' shown in FIG. 5 has a display position variation circuit 24 in the burn-in prevention circuit 2'. Other parts of the image display apparatus 8' are the same as the image display apparatus 8 shown in FIG. 1. The display position variation circuit 24 receives the pixel data FD from the contrast inversion circuit 22, and applies display position variation processing on the pixel data FD to generate further modified pixel data FD' which changes the display position of the display object with an elapse of time. The display position variation circuit 24 then supplies the pixel data FD' to the selector 4 as the burn-in prevention pixel data.

According to the burn-in prevention circuit 2' in FIG. 5, the 'A' character in the image based on the burn-in prevention pixel data FD' displayed in the form shown in FIG. 3A to 3C or FIG. 4, for example, change the display position with an elapse of time. Accordingly, burn-in can be more effectively prevented.

Although, in the above described embodiments, quantization is performed on input pixel data PD in order to blur the contour of the display object in the image, the present invention is not limited in this regard. For instance, mosaic processing may be implemented to blur the outline of the display object. In short, the quantizer 21 may be replaced by any suitable circuit or module or unit that can blur the outline of the display object in the image.

This application is based on a Japanese patent application No. 2003-102596, and the entire disclosure thereof is incorporated herein by reference.

What is claimed is:

1. A device for preventing burn-in of a display screen of an image display device, the device comprising:
   a blurring device for applying a blurring process to a single screen of an input image signal, without shifting an image represented by the input image signal, to obtain a single screen of a blurred image signal; and
   a contrast inversion device for inverting contrast of a luminance level of the single screen of the blurred image signal to generate a single screen of a burn-in prevention image signal, and
   wherein pixel data of the single screen of the input image signal is grouped into a plurality of pixel blocks, each pixel block includes N rows×M columns of pixels, and the blurring device includes a quantizer that quantizes the pixel data of the single screen of the input image signal for each pixel block, and
   wherein a quantization level of the quantizer increases successively for a series of screens of the input image signal, and when the quantization level reaches its highest level, then the quantization level returns to its lowest level.

2. The device according claim 1, further comprising:
   a device for varying a size of the pixel block for each field of the single screen of the input image signal.

3. The device according to claim 1, further comprising:
   a device for applying a position variation process to the single screen of the burn-in prevention image signal to shift, with an elapse of time, a display position on the display screen of a display object that is displayed on the basis of the single screen of the input image signal.

4. The device according to claim 1, wherein the blurring device includes a mosaicking circuit that mosaicks the pixel data of the single screen of the input image signal for each pixel block.

5. The device according to claim 4, further comprising:
   a device for varying a size of the pixel block for each field of the single screen of the input image signal.

6. The device according to claim 4, further comprising:
   a device for applying a position variation process to the single screen of the burn-in prevention image signal to shift, with an elapse of time, a display position on the display screen of a display object that is displayed on the basis of the single screen of the input image signal.

7. The device according to claim 1, wherein the blurring device applies the blurring process when the input image signal includes a still image which lasts at least a first predetermined period, and
   the device further comprises:
   a controller for increasing the luminance level of the blurred, contrast-inverted image signal if the still image lasts a second predetermined period which is longer than the first predetermined period.

8. A method of preventing burn-in of a display screen of an image display device, the method comprising:
   A) subjecting an input image signal to blurring, without shifting an image represented by the input image signal, to obtain a blurred image signal; and
   B) subjecting the blurred image signal to contrast inversion to invert contrast of a luminance level of the blurred image signal to generate a burn-in prevention image signal, wherein pixel data of the input image signal is grouped into a plurality of pixel blocks, each pixel block includes N rows×M columns of pixels, and said subjecting the input image signal to blurring includes quantizing the pixel data of the input image signal for each pixel block;
   D) increasing a quantization level of a quantizater successively for a series of screens of the input image signal; and
   E) returning the quantization level to its lowest level when the quantization level reaches its highest level.

9. The method according to claim 8, further comprising:
   varying a size of the pixel block for each field of the input image signal.

10. The method according to claim 8, further comprising:
    applying a position variation process to the burn-in prevention image signal to shift, with an elapse of time, a display position on the display screen of a display object that is displayed on the basis of the input image signal.

11. The method according to claim 8, wherein said subjecting the input image signal to blurring includes mosaicking the pixel data of the input image signal for each pixel block.

12. The method according to claim 11, further comprising:
    varying a size of the pixel block for each field of the input image signal.

13. The method according to claim 11, further comprising:
    applying a position variation process to the burn-in prevention image signal to shift, with an elapse of time, a display position on the display screen of a display object that is displayed on the basis of the input image signal.

14. The method according to claim 8, wherein said subjecting the input image signal to blurring is performed when the input image signal includes a still image which lasts at least a first predetermined period, and the method further comprises:

C) increasing the luminance level of the blurred, contrast-inverted image signal if the still-image lasts a second predetermined period which is longer than the first predetermined period.

15. A display apparatus comprising:

a display device including a display screen;

a contour modification circuit for blurring an input image, without shifting the input image, to obtain a blurred image when the input image includes a still image;

a contrast inversion circuit for inverting contrast of a luminance level of the blurred image to obtain a contrast inverted image; and a driver for displaying the contrast inverted image on the display screen when the input image includes a still image, and wherein the contour modification circuit includes a quantizer, and wherein a quantization level of the quantizer increases successively for a series of screens of the input image, and when the quantization level reaches its highest level, then the quantization level returns to its lowest level.

16. The display apparatus according to claim 15, wherein the contour modification circuit includes a mosaicker.

17. The display apparatus according to claim 15, wherein pixels of the input image are grouped into a plurality of pixel blocks, and the contour modification circuit blurs the pixels of the input image for each pixel block.

18. The display apparatus according to claim 17, further comprising:

a controller for varying a size of the pixel block for each field of the input image.

19. The display apparatus according to claim 15, further comprising:

a second controller for shifting, with an elapse of time, a display position of the burn-in prevention image on the display screen.

20. The display apparatus according to claim 15, wherein the contour modification circuit blurs the input image when the input image includes a still image which lasts at least a first predetermined period, and the display apparatus further comprises:

a controller for increasing the luminance level of the blurred, contrast-inverted image signal if the still image lasts a second predetermined period which is longer than the first predetermined period.

* * * * *